(12) United States Patent
Ando (10) Patent No.: US 9,094,850 B2
(45) Date of Patent: Jul. 28, 2015

(54) ASSISTANCE DEVICE (71) Applicant: Brother Kogyo Kabushiki Kaisha, Nagoya-shi, Aichi-ken (JP)

(72) Inventor: Satoko Ando, Chita (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/024,326

(22) Filed: Sep. 11, 2013

(65) Prior Publication Data

US 2014/0010115 A1      Jan. 9, 2014

Related U.S. Application Data

(63) Continuation of application No. 13/072,757, filed on Mar. 27, 2011, now Pat. No. 8,560,680.

(30) Foreign Application Priority Data

Aug. 31, 2010   (JP) .................................. 2010-193349

(51) Int. Cl.
*G06F 15/173*      (2006.01)
*H04W 24/02*      (2009.01)
*H04L 12/24*      (2006.01)
*H04L 29/12*      (2006.01)
*H04W 48/20*      (2009.01)

(52) U.S. Cl.
CPC ........... *H04W 24/02* (2013.01); *H04L 41/0806* (2013.01); *H04L 61/2015* (2013.01); *H04L 61/2514* (2013.01); *H04W 48/20* (2013.01)

(58) Field of Classification Search
USPC ............ 709/201, 220; 455/410, 435; 370/252
See application file for complete search history.

(56) References Cited

U.S. PATENT DOCUMENTS

| 2004/0229606 A1 | 11/2004 | Oshima et al. |
| 2006/0105714 A1* | 5/2006 | Hall et al. ..................... 455/41.3 |
| 2006/0230420 A1* | 10/2006 | Kawai et al. .................. 725/105 |
| 2007/0133429 A1* | 6/2007 | Huang et al. .................. 370/252 |
| 2007/0147318 A1* | 6/2007 | Ross et al. ..................... 370/338 |
| 2010/0005506 A1* | 1/2010 | Lum ................................ 726/1 |
| 2010/0095359 A1* | 4/2010 | Gordon ............................. 726/6 |
| 2010/0165879 A1* | 7/2010 | Gupta et al. .................. 370/254 |

FOREIGN PATENT DOCUMENTS

| JP | 2004-320410 A | 11/2004 |
| JP | 2005-150794 A | 6/2005 |

* cited by examiner

*Primary Examiner* — Bunjob Jaroenchonwanit
(74) *Attorney, Agent, or Firm* — Baker Botts L.L.P.

(57) ABSTRACT

An assistance device may provide a user with an identifier of an access point which is to be set in a wireless device. The assistance device may extract, from network information related to a network and stored in the assistance device, an IP address of an assignment server which had assigned an IP address to the assistance device. The assistance device may obtain from the access point, by utilizing the extracted IP address of the assignment server, information including the identifier of the access point, so as to display the information including the identifier of the access point on a display unit.

5 Claims, 4 Drawing Sheets

| | First Assistance Process (Figure 2) | Second Assistance Process (Figure 3) |
|---|---|---|
| (Case A)<br>4 — AP(DHCP=ON) — IP Address<br>20 — PC | SSID etc. is Displayed in S16 | Number of Hops = 1 in S28<br>↓<br>SSID etc. is Displayed in S30 |
| (Case B-1)<br>6 — Router(DHCP=ON)<br>8 — AP(DHCP=OFF) — IP Address<br>20 — PC | SSID etc. is not Displayed in S16 | Number of Hops = 2 in S28<br>↓<br>SSID etc. is Displayed in S34 |
| (Case B-2-1)<br>6 — Router(DHCP=ON)<br>8 — AP(DHCP=ON) — IP Address<br>20 — PC | SSID etc. is not Displayed in S16 | Number of Hops = 2 in S28<br>↓<br>SSID etc. is Displayed in S34 |
| (Case B-2-2)<br>6 — Router(DHCP=ON)<br>8 — AP(DHCP=ON) — IP Address<br>20 — PC | SSID etc. is Displayed in S16 | Number of Hops = 1 in S28<br>↓<br>SSID etc. is Displayed in S30 | derlying
ASSISTANCE DEVICE

CROSS-REFERENCE TO RELATED APPLICATIONS

This application is a continuation of U.S. patent application Ser. No 13/072,757, filed on Mar. 27, 2011, which claims priority to Japanese Patent Application No. 2010-493349, filed on Aug. 31, 2010, the contents of which are hereby incorporated by reference into the present application.

TECHNICAL FIELD

The present specification discloses an assistance device for providing a user with an identifier of an access point which is to be set in a wireless device.

DESCRIPTION OF RELATED ART

In order to have a wireless device (e.g., a printer) participate in a wireless network including an access point, a user normally sets wireless setting information including an SSID (Service Set IDentifier) of the access point to the wireless device. When such wireless setting is performed, the wireless device normally displays a list including SSIDs of one or more access points existing around the wireless device itself. By selecting one SSID from the list, the user can set the SSID to the wireless device.

SUMMARY

For example, when wireless setting is performed, in a case where two or more access points exist around the wireless device, the wireless device normally displays a list including two or more SSIDs. In this case, a user having limited knowledge of wireless communication is unable to determine which SSID should be selected from the two or more SSIDs.

The present specification provides a technique that enables a user to easily set, to a wireless device, an identifier of an access point which is to be set in the wireless device.

The present specification discloses an assistance device for providing a user with an identifier of an access point which is to be set in a wireless device. The assistance device may comprise, an extracting unit and a display controlling unit. The extracting unit may be configured to extract, from network information related to a network and stored in the assistance device, an IP address of an assignment server which had assigned an IP address to the assistance device. The display controlling unit may be configured to obtain from the access point, by utilizing the extracted IP address of the assignment server, information including the identifier of the access point, so as to display the information including the identifier of the access point on a display unit.

Moreover, a control method, a computer program, and a computer readable device storing, the computer program for realizing the assistance device described above are also novel and useful. Furthermore, a system comprising two or more devices among the assistance device described above, an assignment server, and an access point is also novel and useful.

BRIEF DESCRIPTION OF THE DRAWINGS

FIG. 4 shows, for each case, which step of the first and second assistance processes wireless setting information is displayed in.

Figure 1:
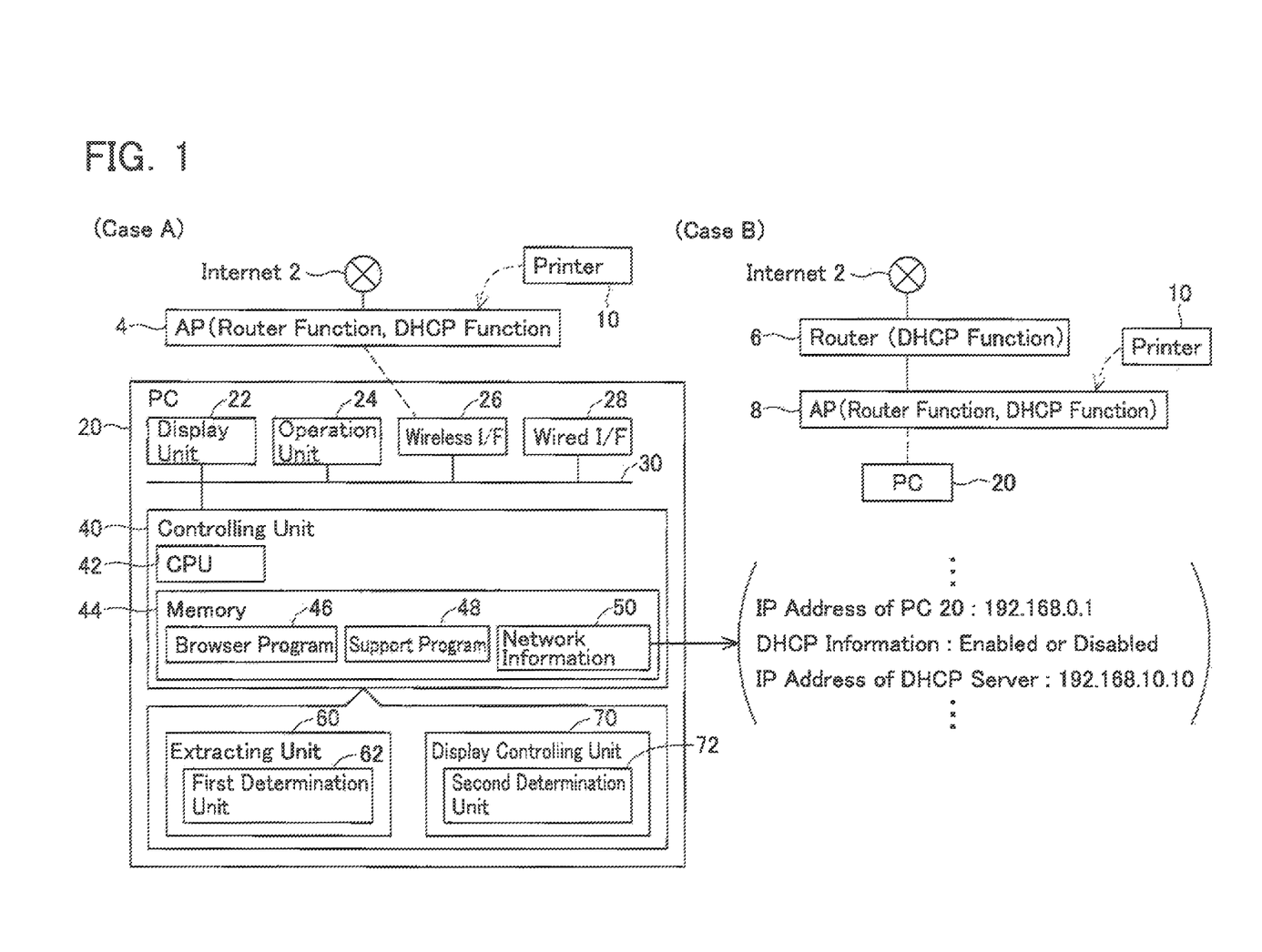
FIG. 1 shows a configuration of a system according to an embodiment.

EMBODIMENT (System Configuration of Case A)
The technique according to the present embodiment is applicable to systems of both a case A and a case B shown in FIG. 1. First, a configuration of a system of the case A will be described. The system of the case A may, e.g., constitute a home LAN. The system of the case A comprises an access point (hereinafter referred to as an "AP") 4, a printer 10, and a PC 20.

(Configuration of AP 4)
The AP 4 is connected to the Internet 2. The AP 4 functions as a relay point (in other words, an AP) for wireless communication, and further has a NAT (Network Address Translation) function, a router function, and a DHCP (Dynamic Host Configuration Protocol) function. The NAT function is a function for executing address translation between an IP address used on the Internet 2 (in other words, a global IP address) and an IP address used in a LAN that includes the AP 4 (in other words, a local IP address). The router function includes a filtering function and a routing function. The filtering function is a function for allowing passage of a packet in which a predetermined IP address (e.g., an IP address within a range of IP addresses including a predetermined network address) is designated as destination and not allowing passage of a packet in which an IP address other than the predetermined IP address is designated as destination. The routing function is a function for handing over a packet to a next router (or a specific device corresponding to an IP address of a destination designated in the packet) so that the packet is sent to the specific device along an optimal route. The DHCP function is a function for assigning an IP address to a device (e.g., the PC 20) connected to a LAN including the AP 4.

The AP 4 further has a web server function. The web server function of the AP 4 is a function for sending to an external device, in response to a request from a web browser of the external device (e.g., the PC 20), data representing a web page including wireless setting information (sometimes also referred to as a "wireless profile") currently being used in the AP 4. In the present embodiment, wireless setting information in a web page includes an SSID of the AP 4, an authentication method (WPA, WPA2, or the like), an encryption scheme (AES, TKIP, or the like), and an encryption key (in other words, a password).

(Configuration of Printer 10)
The printer 10 executes printing according to data sent from an external device (e.g., the PC 20). The printer 10 is not yet connected to the LAN including the AP 4, and is about to be connected to the LAN. In the present embodiment, the printer 10 is to be connected to the LAN by a wireless connection. In other words, the printer 10 is to participate in a wireless network including the AP 4. In order to have the printer 10 participate in the wireless network, the user must set wireless setting information currently used in the AP 4 to the printer 10. Hereinafter, setting (in other words, storing) the wireless setting information to the printer 10 will be referred to as "wireless setting".

(Wireless Setting Modes of Printer 10)
Methods for the user to perform the wireless setting on the printer 10 include a so-called automatic wireless setting mode (sometimes also referred to as a "easy wireless setting mode") and a manual wireless setting mode. In the automatic wireless setting mode, e.g., when the user operates a button provided on the AP 4 or inputs a PIN code into the AP 4, the AP 4 sends the wireless setting information currently being used in the AP 4 (e.g., an SSID of the AP 4, and an authentication method, an encryption method and an encryption key currently being used in the AP 4) to the printer 10. The printer 10 sets the wireless setting information acquired from the AP 4 as wireless setting information of the printer 10 itself. As a result, the printer 10 can participate in the wireless network including the AP 4. In other words, the printer 10 can communicate with other devices via the AP 4 by utilizing the wireless setting information that has been set in the printer 10 itself.

On the other hand, in the manual wireless setting mode, the printer 10 first searches for APs existing around the printer 10, and causes a list including SSIDs of the APs that have been found to be displayed on a display unit (not shown) of the printer 10. The user operates an operation unit (not shown) of the printer 10 to select one SSID (the SSID of the AP 4 in this embodiment) from the list. Furthermore, in the manual wireless setting mode, the printer 10 normally causes a list, including a plurality of combinations of authentication methods and encryption methods on the display unit of the printer 10. The user selects one combination of an authentication method and an encryption method from the list. Moreover, in the manual wireless setting mode, the user normally inputs the encryption key currently being used in the AP 4 into the printer 10. The printer 10 sets the wireless setting information selected or inputted by the user as wireless setting information of the printer 10 itself. As a result, the printer 10 can participate in the wireless network including the AP 4.

As described above, in the manual wireless setting mode, the printer 10 searches for the APs existing around the printer 10. For example, when the AP 4 constitutes a LAN in a specific home, the printer 10 may possibly find, in addition to the AP 4, an AP existing in an other home in a vicinity of the specific home. In this case, the printer 10 displays two or more SSIDs including the SSID of the AP 4 existing in the specific home and an SSID of the AP existing in the other home. Although the user must appropriately select the SSID of the AP 4 from the two or more SSIDs displayed on the printer 10, if the user has only limited knowledge of wireless communication, the user may find it difficult to determine which SSID should be selected. In particular, in a case where construction of a wireless network including the AP 4 had been commissioned to a professional contractor, it is likely that the user is not aware of (or has forgotten) the SSID of the AP 4 because the contractor may decide the SSID of the AP 4. In the present embodiment, the PC 20 described below is adopted in order to display information for assisting the user when the wireless setting of the printer 10 is to be performed in the manual wireless setting mode.

(Configuration of PC 20)

The PC 20 comprises a display unit 22, an operation unit 24, a wireless interface 26, a wired interface 28, and a controlling unit 40. The respective units 22 to 28 and 40 are connected to a bus line 30. The display unit 22 is a display for displaying various types of information. The operation unit 24 comprises a keyboard and a mouse. By operating the operation unit 24, a user of the PC 20 can input various information into the PC 20. The wireless interface 26 is an interface for wireless communication. The wired interface 28 is an interface for wired communication to which a LAN cable or the like is connected. In the present embodiment, the PC 20 is connected to the wireless network including the AP 4 by the wireless connection. In other words, the wireless setting information currently being used in the AP 4 is set to the PC 20, and the PC 20 is capable of communicating with other devices (e.g., devices on the Internet 2) via the AP 4.

The controlling unit 40 comprises a CPU 42 and a memory 44 such as a ROM, a RAM, or the like. The CPU 42 executes various processes according to programs 46 and 48 stored in the memory 44. Respective functions of an extracting unit 60 and a display controlling unit 70 are realized due to the CPU 42 executing processes according to the programs 46 and 48. Moreover, the extracting unit 60 comprises a first determination unit 62 and the display controlling unit 70 comprises a second determination unit 72.

The memory 44 stores the browser program 46, the support program 48, and network information 50. The browser program 46 is a program for acquiring a web page by communicating with a web server and causing the web page to be displayed on the display unit 22. The browser program 46 is a known program that is installed in the PC 20 from, e.g., a medium. The support program 48 is a program for executing first and second assistance processes, to be described later. The support program 48 is installed into the PC 20 from a medium provided by a vendor or manufacturer of the printer 10 (a medium packaged together with the printer 10 upon shipment of the printer 10). However, the support program 48 may be installed into the PC 20 via the Internet from a server provided by the vendor or manufacturer of the printer 10.

(Content of Network Information 50)

The network information 50 is information related to a network to which the PC 20 is connected (the wireless network including the AP 4 in this embodiment). As illustrated in FIG. 1, the network information 50 includes an IP address of the PC 20, information (hereinafter referred to as "DHCP information") indicating whether or not the IP address of the PC 20 is an IP address assigned by a DHCP server, and an IP address of a DHCP server that had assigned the IP address to the PC 20.

The user of the PC 20 can select whether or not a DHCP server is to be used by operating the operation unit 24. When using the DHCP server has been selected, "Enabled" is stored in the memory 44 as "DHCP information". In addition, when not using the DHCP server has been selected, "Disabled" is stored in the memory 44 as "DHCP information".

Figure 4:
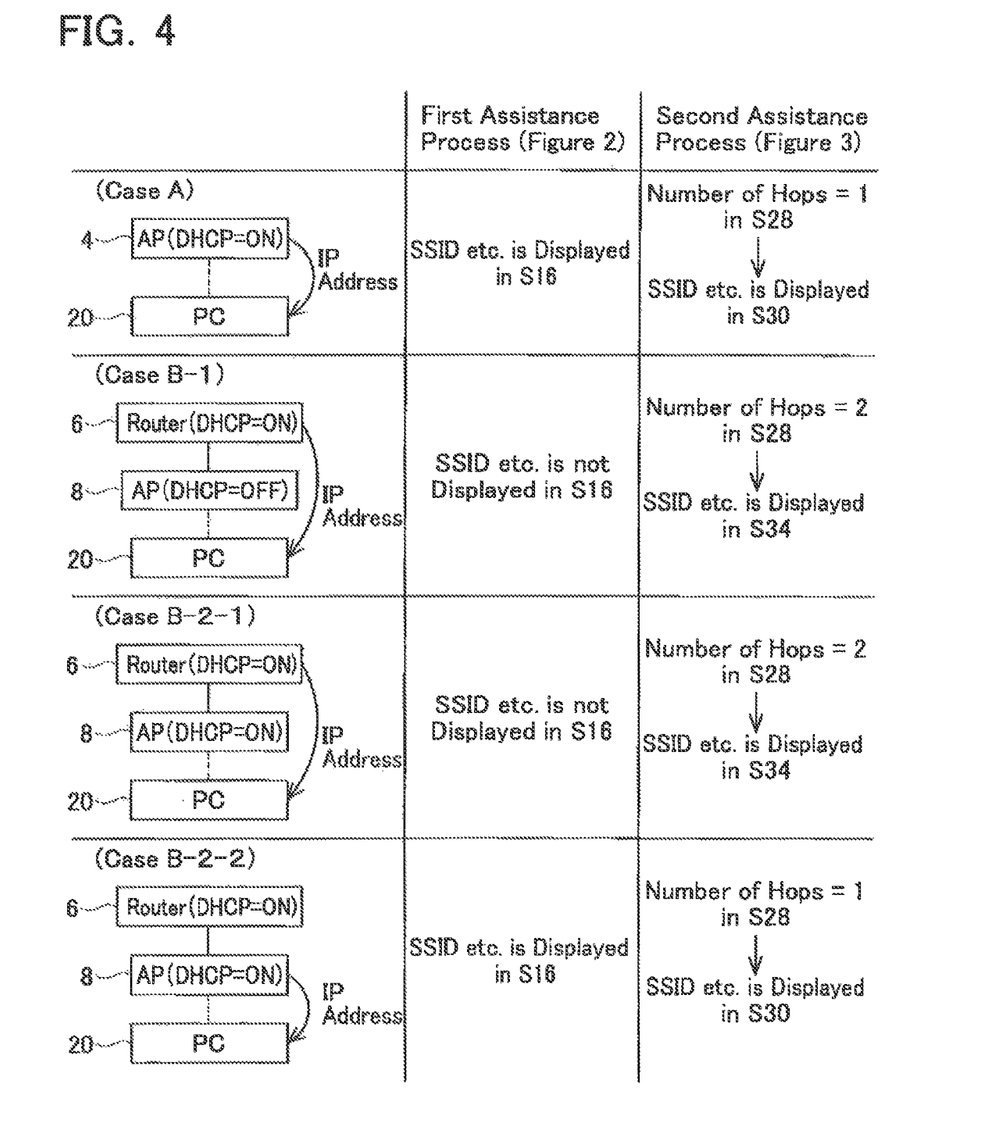

When the "DHCP information" included in the network information 50 indicates "Enabled", the DHCP server (in other words, the AP 4) assigns an IP address to the PC 20 at a predetermined timing (refer to the case A shown in FIG. 4). In doing so, the IP address assigned to the PC 20 by the DHCP server is stored in the memory 44 as the "IP address of the PC 20" included in the network information 50. Furthermore, when the IP address is assigned to the PC 20 by the DHCP server, an IP address of the DHCP server (in other words, the IP address of the AP 4) is sent from the DHCP server to the PC 20. In doing so, the IP address of the DHCP server is stored in the memory 44 as the "IP address of the DHCP server" included in the network information 50.

On the other hand, when the "DHCP information" included in the network information 50 indicates "Disabled", the DHCP server does not assign an IP address to the PC 20. Normally, the user of the PC 20 operates the operation unit 24 to input, into the PC 20, an IP address (in other words, a fixed (static) IP address) that should be set as the IP address of the PC 20. In doing so, the IP address input to the PC 20 by the user is stored in the memory 44 as the "IP address of the PC 20" included in the network information 50. Moreover, in this case, the IP address of the DHCP server is not included in the network information 50.

(System Configuration of Case B)

Similar to the system of the case A, the system of the case B may, e.g., constitute a home LAN. The system of the case B comprises a router 6, an AP 8, a printer 10, and a PC 20. The router 6 is connected to the Internet 2 and also to the AP 8 by a wired connection. The router 6 has the NAT function, the router function, and the DHCP function.

The AP 8 functions as a relay point (in other words, an AP) for wireless communication, and further has the router function and the DHCP function. Moreover, similar to the AP 4 of the case A, the AP 8 further has a web server function.

The printer 10 is not yet connected to a LAN including the AP 8, and is about to be connected to the LAN. In addition, the PC 20 is connected to the AP 8 by a wireless connection. Moreover, configurations of the printer 10 and the PC 20 are the same as those in the case A.

Although only a single AP 8 is connected to the router 6 in the system of the case B in FIG. 1, a plurality of APs can be connected to the router 6. In other words, while only a single AP exists in the system of the case A, the number of APs can be increased in the system of the case B. Therefore, compared to the system of the case A, a greater number of devices (PCs, printers, and the like) can participate in the wireless network in the system of the case B.

In the system of the case B, both the router 6 and the AP 8 have the DHCP function. An administrator of the system (in other words, a user of the printer 10 and the PC 20) normally turn on the DHCP function of the muter 6 and turn off the DHCP function of the AP 8. In this case, the router 6 assigns an IP address to the PC 20 (refer to a case B-1 in FIG. 4). Therefore, in this case, the IP address of the router 6 is stored in the memory 44 of the PC 20 as the "IP address of the DHCP server" included in the network information 50.

However, there may be a case where both the DHCP function of the router 6 and the DHCP function of the AP 8 are turned on In this case, the router 6 may assign an IP address, to the PC 20 (refer to a case B-2-1 in FIG. 4) and the AP 8 may also assign an IP address to the PC 20 (refer to a case B-2-2 in FIG. 4). In the former case, the IP address of the router 6 is stored in the memory 44 of the PC 20 as the "IP address of the DHCP server" included in the network information 50. In the latter case, the IF address of the AP 8 is stored in the memory 44 of the PC 20 as the "IP address of the DHCP server" included in the network information 50.

(First Assistance Process)

Next, contents of processes executed by the PC 20 according to the support program 48 will be described. Moreover, the respective processes below may be executed in systems of both the case A and the case B. When a user desires to have the printer 10 participate in the wireless network the user operates the operation unit 24 of the PC 20 and activates the support program 48. In this case, according to the support program 48, the controlling unit 40 of the PC 20 first executes the first assistance process shown in FIG. 2.

Figure 2:
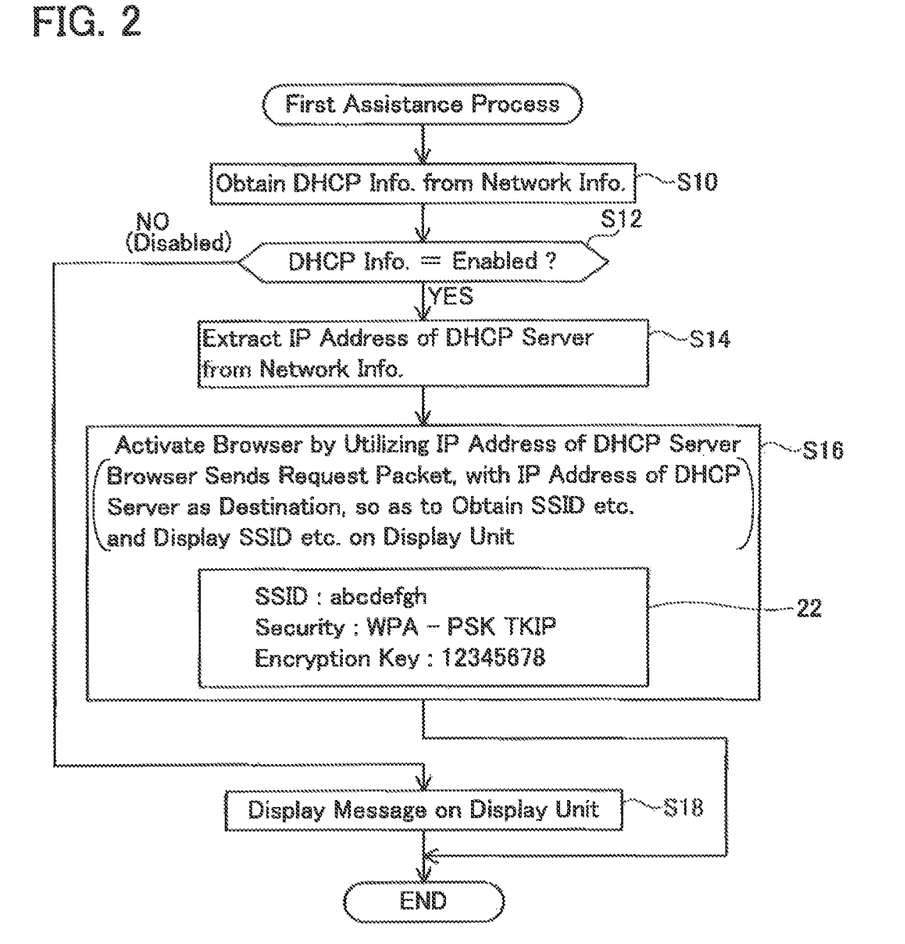
FIG. 2 shows a flow chart of a first assistance process executed by a PC.

In the first assistance process, in S10, the first determination unit 62 acquires the DHCP information (in other words, "Enabled" or "Disabled") from the network information 50 in the memory 44. In the present embodiment, in S10, the first determination unit 62 (refer to FIG. 1) utilizes a specific API (Application Programming Interface) prepared in an OS program. In other words, by activating the specific API, the first determination unit 62 causes the specific API to acquire the network information 50 in the memory 44, and then acquires the DHCP information from the network information 50 acquired by the specific API.

Alternatively, in a modification thereof, in S10, the first determination unit 62 may acquire the network information 50 in the memory 44 by executing an IPConfig command instead of utilizing the specific API. In other words, generally speaking, the network information 50 may be information equivalent to information acquired using the IPConfig command.

Next, in S12, the first determination unit 62 determines whether or not the DHCP information acquired in S10 indicates "Enabled". In other words, in S12, the first determination unit 62 determines whether or not the current IP address of the PC 20 is the IP address assigned by the DHCP server (e.g., the AP 4 in the case A).

In a case where a determination is made that the DHCP information indicates "Disabled", in other words, in a case where a determination is made that the current IP address of the PC 20 is not the IP address assigned by the DHCP server (in a case of NO in S12), in S18, the display controlling unit 70 (refer to FIG. 1) causes, to be displayed on the display unit 22, a message indicating that wireless setting information cannot be displayed. Upon conclusion of S18, the first assistance process ends.

On the other hand, in a case where a determination is made that the DHCP information indicates "Enabled", in other words, in a case where a determination is made that the current IP address of the PC 20 is the IP address assigned by the DHCP server (in a case of YES in S12), in S14, the extracting unit 60 (refer to FIG. 1) extracts the "IP address of the DHCP server" from the network information 50 acquired in S10. As a result, the IP address of the DHCP server that had assigned the current IP address of the PC 20 (e.g., the AP 4 in the case A) is extracted.

Next, in S16, the display controlling unit 70 activates the browser program 46 by utilizing the "IP address of the DHCP server" extracted in S14. In other words, the display controlling unit 70 instructs the browser program 46 to send a request packet for requesting a web page with the "IP address of the DHCP server" extracted in S14 as destination. The respective processes carried out until issuing the above instruction to the browser program 46 are realized by the support program 48.

Processes after the above instruction is issued to the browser program 46 in S16 are executed by the display controlling unit 70 that is realized by the browser program 46. In other words, the display controlling unit 70 sends a request packet (in other words, a signal for requesting wireless setting information including an SSID of an AP to be set to the printer 10) for requesting a web page (e.g., a top page) with the "IP address of the DHCP server" extracted in S14 as destination.

(Case A)

For example, in the system of the case A, as shown in the case A in FIG. 4, the IP address is assigned to the PC 20 by the DHCP server configured integrally with the AP 4. Therefore, the "IP address of the DHCP server" extracted in S14 is the IP address of the AP 4. Therefore, when the request packet is sent from the PC 20 in S16 in FIG. 2, the AP 4 receives the request packet and activates the web server function. As a result, the web server function of the AP 4 sends to the PC 20 data representing a web page including the wireless setting information currently being used in the AP 4 (e.g., the SSID of the AP 4, and the authentication method, the encryption method, and the encryption key currently being used in the AP 4). The display controlling unit 70 of the PC 20 causes the web page represented by the data acquired from the AP 4 to be displayed on the display unit 22. As a result, as shown in S16 in FIG. 2, the SSID of the AP 4 (abcdefgh), the authentication method (WPA-PSK), the encryption method (TKIP), and the encryption key (12345678) are displayed on the display unit 22. Therefore, the user is able to learn the wireless setting information currently being used in the AP 4.

(Case B-2-2)

In addition, e.g., in the system of the case B, as shown in the case B-2-2 in FIG. 4, the IP address is assigned to the PC 20 by a DHCP server configured integrally with the AP 8. In this case, the "IP address of the DHCP server" extracted in S14 is the IP address of the AP 8. Therefore, when the request packet is sent from the PC 20 in S16 in FIG. 2, the AP 8 receives the request packet and activates the web server function. Subsequent processes are the same as those in the case A. Therefore, the user is able to learn the wireless setting information currently being used in the AP 8. Upon conclusion of S16, the first assistance process ends.

(Wireless Setting of Printer 10)

When the wireless setting information currently being used in the AP 4 (or AP 8) is displayed on the display unit 22 of the PC 20, the user operates the operation unit (not shown) of the printer 10 so as to perform the wireless setting on the printer 10. Specifically, when a predetermined operation is executed on the operation unit of the printer 10, the printer 10 causes a message prompting a selection of one mode of the automatic wireless setting mode and the manual wireless setting mode to be displayed on the display unit of the printer 10. The user can operate the operation unit of the printer 10 to select the manual wireless setting mode.

When the manual wireless setting mode is selected, as described above, the printer 10 searches for the APs existing around the printer 10, and causes the list including the SSIDs of the APs that have been found to be displayed on the display unit of the printer 10. The user is aware of the SSID (abcdefgh) displayed on the display unit 22 of the PC 20 in S16 in FIG. 2. Therefore, assuming that a plurality of SSIDs (e.g., the SSID of the AP existing in the home of the user and the SSID of the AP existing in the other home) is displayed on the display unit of the printer 10, the user is able to select an SSID of an AP to be set to the printer 10, in other words, the SSID displayed in S16 in FIG. 2 (e.g., the SSID of the AP existing in the home of the user) from the plurality of SSIDs.

Furthermore, in the present embodiment, by referring to the web page displayed in S16 in FIG. 2, the user is able to learn the authentication method (WPA-PSK), the encryption method (TKIP), and the encryption key (12345678). Therefore, the user is able to select a single combination displayed on the display unit of the printer 10 in S16 in FIG. 2 among a plurality of combinations of authentication methods and encryption methods. Furthermore, if needed (if a combination of an authentication method and an encryption method that requires an encryption key is selected), the user inputs the encryption key in the web page displayed in S16 of FIG. 2 into the printer 10. Accordingly, the wireless setting is appropriately performed on the printer 10.

By executing the first assistance process, the PC 20 can provide the user with the wireless setting information to be set to the printer 10 in the case A or in the case B-2-2. A user having limited knowledge of wireless communication can easily set the wireless setting information displayed by the PC 20 to the printer 10. As a result, the user can have the printer 10 participate in the wireless network in an appropriate manner.

(Case B-1, Case B-2-1)

In the case B-1 or the case B-2-1 shown in FIG. 4, the IP address is assigned to the PC 20 by the DHCP server (in other words, the router 6) configured separately with the AP 8. Therefore, the "IP address of the DHCP server" extracted in S14 in FIG. 2 is not the IP address of the AP 8 but the IP address of the router 6. Consequently, with the case B-1 or the case B-2-1, in S16 in FIG. 2, the display controlling unit 70 sends the request packet with the IP address of the router 6 as destination and, as a result, the data representing the web page including the wireless setting information currently being used in the AP 8 cannot be acquired. Therefore, in the case B-1 or the case B-2-1, useful information (in other words, the wireless setting information to be set to the printer 10) is not displayed in S16 in FIG. 2. In consideration of such cases, the PC 20 according to the present embodiment further adopts the following configuration.

(Second Assistance Process)

Figure 3:
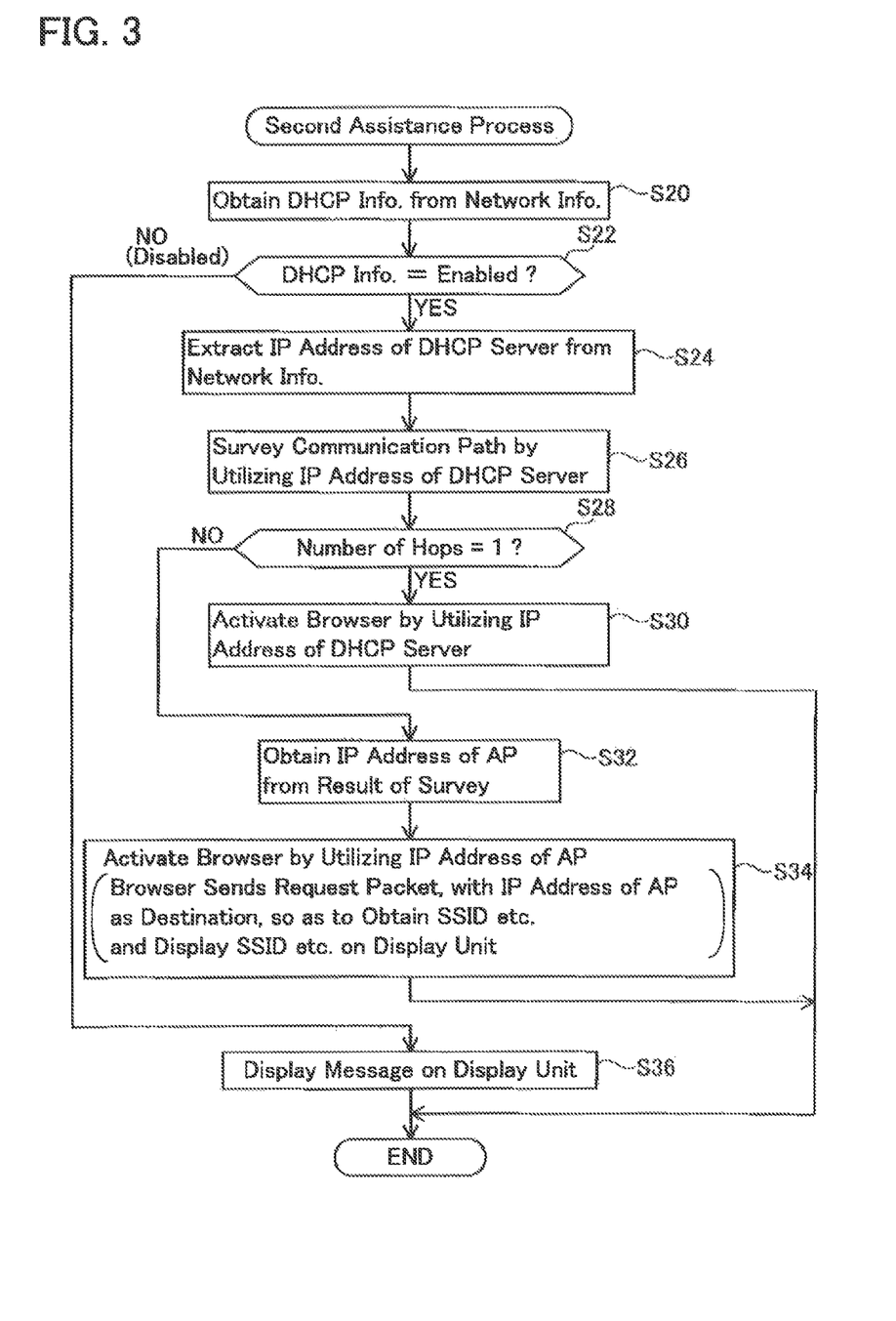
FIG. 3 shows a flow chart of a second assistance process executed by a PC.

After S16 in FIG. 2 is executed, the display controlling unit 70 causes a message to be displayed on the display unit 22 which prompts the user to select whether or not a further assistance process is to be executed. Therefore, when the useful information is not displayed (e.g., in the case B-1 or the case B-2-1), the user can select the further assistance process to be executed. In this case, the controlling unit 40 further executes the second assistance process shown in FIG. 3. S20 to S24 in FIG. 3 are the same as S10 to S14 in FIG. 2. In addition, S36 that is executed in a case of NO in S22 is the same as S18 in FIG. 2.

(Survey of Communication Path)

In S26, the display controlling unit 70 surveys a communication path by utilizing the "IP address of the DHCP server" acquired in S24. Specifically, the display controlling unit 70 sends an ICMP (Internet Control Message Protocol) packet by utilizing a specific API for performing a path survey in which the "IP address of the DHCP server" acquired in S24 has been designated as destination. The specific API is provided by the OS program. Alternatively, in a modification thereof, in S26, the display controlling unit 70 may send the ICMP packet by executing a path survey command (e.g., a command equivalent to a traceroute command or a tracert command) instead of utilizing the specific API.

Moreover, as well known, the ICMP packet includes an IP header in which a TTL (Time To Live) can be set. Whenever an ICMP packet passes a single router, "1" is subtracted from the TTL. When the ICMP packet sent from the PC 20 reaches the target destination (in the present embodiment, the "IP address of the DHCP server" acquired in S24) before the TTL becomes "0", the target destination sends a reply packet to the PC 20. On the other hand, when the TTL becomes "0" before the ICMP packet sent from the PC 20 reaches the target destination, a router that had subtracted the TTL to "0" sends an error packet to the PC 20. In other words, TTL is a value related to, the number of hops that is the number of routers through which an ICMP packet is able to pass.

In the present embodiment, when executing a first path survey, the display controlling unit 70 sets the TTL inside the ICMP packet to "1". For example, in the case B-1 or the case B-2-1 (refer to FIG. 4), the "IP address of the DHCP server" acquired in S24 is not the IP address of the AP 8 but the IP address of the router 6. Therefore, when the display controlling unit 70 sends a first ICMP packet by setting the "IP address of the DHCP server" acquired in S24 as destination and by setting the TTL to "1", the first ICMP packet initially arrives at the AP 8. Since the AP 8 is equipped with the router function, "1" is subtracted from the TTL (in other words, "1"). As a result, the TTL becomes "0" and the AP 8 sends the error packet to the PC 20.

Upon acquiring the error packet, the display controlling unit 70 increases the TTL by just "1" and executes a second path survey. In other words, the display controlling unit 70 sends a second ICMP packet by setting the "IP address of the DHCP server" acquired in S24 as destination and by setting the TTL to "2". In the case B-1 or the case B-2-1 (refer to FIG. 4), the AP 8 subtracts "1" from the TTL (in other words, "2") included in the second ICMP packet. Furthermore, the AP 8 sends the second ICMP packet to the router 6. As a result, the second ICMP packet reaches the router 6. Therefore, the router 6 sends a reply packet to the PC 20 and the display controlling unit 70 of the PC 20 acquires the reply packet. Once the reply packet is acquired, the communication path survey (the process of S26) ends. Moreover, the reply packet that is sent from the router 6 to the PC 20 includes the IP address of the router 6 (in other words, the "IP address of the DHCP server" acquired in S24) as an IP address corresponding to the number of hops=2 (in other words, an IP address of a second device on the communication path as viewed from the PC 20) and the IP address of the AP 8 as an IP address corresponding to the number of hops=1 (in other words, an IP address of a first device on the communication path as viewed from the PC 20).

Moreover, when the display controlling unit 70 is unable to acquire the reply packet even after sending the second and subsequent ICMP packets (in other words, when the display controlling unit 70 receives the error packet), the display controlling unit 70 sends a third and subsequent ICMP packets by increasing the TTL by "1" until the reply packet is acquired.

Moreover, as described above, in the case A or the case B-2-2, the useful information is displayed in S16 in the first assistance process shown in FIG. 2. Therefore, the user normally does not select execution of the second assistance process after the first assistance process is conclude& However, even in the case A or the case B-2-2, the user may select execution of the second assistance process after the first assistance process is concluded. In this case, the following operations are executed in S26 of the second assistance process shown in FIG. 3.

Specifically, in the case A (or the case B-2-2), the "IP address of the DHCP server" acquired in S24 is the IP address of the AP 4 (or the AP 8). Therefore, when the display controlling unit 70 sends the first ICMP packet, the first ICMP packet reaches the AP 4 (or the AP 8) without traveling through a router. Consequently, the AP 4 (or AP 8) sends the reply packet to the PC 20, and the display controlling unit 70 of the PC 20 acquires the reply packet and ends the survey of the communication path (the process of S26). Moreover, the reply packet that is sent from the AP 4 (or the AP 8) to the PC 20 includes the IP address of the AP 4 (or the AP 8) (in other words, the "IP address of the DHCP server" acquired in S24) as the IP address corresponding to the number of hops=1.

After conclusion of S26, the second assistance process proceeds to S28. In S28, the second determination unit 72 (refer to FIG. 1) utilizes the reply packet acquired in S26 to determine whether or not the AP configured separately with the DHCP server that had assigned the IP address to the PC 20 may exist on the communication path between the PC 20 and the DHCP server. Specifically, when the reply packet acquired in S26 includes only the IP address corresponding to the number of hops=1, the second determination unit 72 determines that the AP configured separately with the DHCP server does not exist on the communication path (the second determination unit 72 makes a determination of YES in S28). On the other hand, when the reply packet acquired in S26 includes not only an IP address corresponding to the number of hops=1 but also an IP address corresponding to the number of hops=2, the second determination unit 72 determines that an AP configured separately with the DHCP server may exist on the communication path (the second determination unit 72 makes a determination of NO in S28).

(Case A, Case B-2-2)

For example, in the case A or the case B-2-2 (refer to FIG. 4), the reply packet acquired in S26 includes only an IP address corresponding to the number of hops=1 (in other words, the IP address of the AP 4 (or AP 8)). Therefore, in the case A or the case B-2-2, the second determination unit 72 determines that an AP configured separately with the DHCP server does not exist on the communication path between the PC 20 and the DHCP server (in other words, makes the determination of YES in S28), and proceeds to S30. S30 is the same as S16 in FIG. 2. In other words, in the case A, the wireless setting information currently being used in the AP 4 is displayed on the display unit 22, and in the case B-2-2, the wireless setting information currently being used in the AP 8 is displayed on the display unit 22. Upon conclusion of S30, the second assistance process ends.

(Case B-1, Case B-2-1)

On the other hand, e.g., in the case B-1 or the case B-2-1 (refer to FIG. 4), the reply packet acquired in S26 includes the IP address corresponding to the number of hops=1 (in other words, the IP address of AP 8) and the IP address corresponding to the number of hops=2 (in other words, the IP address of router 6). Therefore, in the case B-1 or the case B-2-1, the second determination unit 72 determines that the AP configured separately with the DHCP server may exist on the communication path between the PC 20 and the DHCP server (in other words, makes the determination of NO in S28), and proceeds to S32.

In S32, the display controlling unit 70 acquires the IP address of the AP 8 by acquiring the IP address corresponding to the number of hops=1 from the reply packet acquired in S26. Next, in S34, the display controlling unit 70 activates the browser program 46 by utilizing the IP address acquired in S32. In other words, the display controlling unit 70 instructs the browser program 46 to send the request packet for requesting the web page with the IP address of the AP 8 acquired in S32 as destination. Moreover, similar to the case of the first assistance process, processes after the above instruction is issued to the browser program 46 in S36 are executed by the display controlling unit 70 that is realized by the browser program 46.

As described above, in the case B-1 or the case B-2-1 (refer to FIG. 4), the IP address acquired in S32 is the IP address of the AP 8. Therefore, when the request packet is sent from the PC 20 in S34, the AP 8 sends data representing the web page including the wireless setting information currently being used in the AP 8 to the PC 20. The display controlling unit 70 causes the web page represented by the data acquired from the AP 8 to be displayed on the display unit 22. As a result, the user can learn the wireless setting information currently being used in the AP 8. The wireless setting of the printer 10 to be subsequently executed is the same as in the case of the first assistance process.

Advantages of Present Embodiment

According to the present embodiment, e.g., in the case A, the PC 20 acquires the wireless setting information from the AP 4 by utilizing the IP address of the DHCP server configured integrally with the AP 4 (S16 in FIG. 2, S30 in FIG. 3). In addition, in the case B-2-2, the PC 20 acquires the wireless setting information from the AP 8 by utilizing the IP address of the DHCP server configured integrally with the AP 8 (S16 in FIG. 2, S30 in FIG. 3). Furthermore, in the case B-1 or the case B-2-1, the PC 20 acquires the IP address of the AP 8 by executing the survey of the communication path by utilizing the IP address of the DHCP server configured separately with the AP 8 (S32 in FIG. 3), and acquires wireless setting information from the AP 8 by utilizing the IP address of the AP 8 (S34 in FIG. 3). Therefore, according to the present embodiment, in any of the cases, the PC 20 is capable of acquiring wireless setting information including the SSID of the AP 4 (or the AP 8) to be set to the printer 10 by utilizing the IP address of the DHCP server that had assigned the IP address to the PC 20, and causing the wireless setting information to be displayed on the display unit 22. Consequently, the user can easily set appropriate wireless setting information (e.g., the wireless setting information currently being used in the AP existing in the home of the user) to the printer 10.

In addition, according to the present embodiment, since the survey of the communication path is executed in S26 of the second assistance process shown in FIG. 3, the PC 20 is able to appropriately determine whether or not the AP 8 having the router function may exist between the PC 20 itself and the DHCP server that had assigned the IP address to the PC 20 (S28 in FIG. 3). Moreover, the PC 20 is capable of appropriately acquiring the IP address of the AP 8 configured separately with the DHCP server based on the result of the communication path survey (in other words, the reply packet) (S32 in FIG. 3).

The PC 20 and the printer 10 are, respectively, examples of an "assistance device" and a "wireless device". The DHCP information included in the network information 50 is an example of "specific information". In addition, the request packet sent in S16 in FIG. 2 (or S30 in FIG. 3) and the request packet sent in S34 in FIG. 3 are, respectively, examples of a "first signal" and a "second signal". The ICMP packet sent in S26 in FIG. 3 and the reply packet in response to the ICMP packet are, respectively, examples of a "specific signal" and a "reply signal".

(First modification) While the PC 20 is adopted as an example of the "assistance device" in the above embodiment, a server, a printer, a scanner, a facsimile, a mobile phone, a PDA, or the like may be adopted instead.

(Second modification) While the printer 10 is adopted as an example of the "wireless device" in the above embodiment, a PC, a server, .a scanner, a facsimile, a mobile phone, a PDA, or the like may be adopted instead.

(Third modification) While the DHCP server is adopted as an example of an "assignment server" in the above embodiment, a BOOTP (Bootstrap Protocol) server may be adopted instead.

(Fourth modification) While the AP 4 has a router function in the system of the case A shown in FIG. 1 in the above embodiment, alternatively, the AP 4 need not be equipped with the router function. Generally speaking, an "access point" may be an access point having the router function (sometimes referred to as a "wireless router") or may be an access point not having the router function (sometimes referred to as a "wireless bridge").

(Fifth modification) While the SSID is adopted as an example of an "identifier of an access point" in the above embodiment; an ESSID (Extended Service Set Identifier) may be adopted instead.

(Sixth modification) The AP 4 (or the AP 8) and the PC 20 may be connected by a wired connection. In other words, generally speaking, the "assistance device" and the "access point" may be connected!to each other so as to be mutually capable of communicating.

(Seventh modification) In the above embodiment, a configuration is adopted in which upon conclusion of S16 of the first assistance process shown in FIG. 2, an inquiry is made to the user regarding whether or not the second assistance process shown in FIG. 3 is to be executed. Alternatively, an inquiry may be made to the user before executing the first assistance process regarding which of the first assistance process and the second assistance process is to be executed.

According to this configuration, e.g., the user who is aware that the system of the case A has been constructed can select the first assistance process, and the user who is aware that the system of the case B has been constructed can select the second assistance process.

(Eighth modification) The support program 48 need not be a program for realizing both the first and second assistance processes of FIGS. 2 and 3, and may be a program for realizing only the first assistance process or a program for realizing only the second assistance process. In other words, generally speaking, the "assistance device" need only be capable of executing at least either the first assistance process or the second assistance process. Both of the assistance processes are capable of realizing a configuration to "obtain from the access point, by utilizing the extracted IP address of the assignment server, information including the identifier of the access point, so as to display the information including the identifier of the access point on a display unit".

(Ninth modification) In the above embodiment, in S16 in FIG. 2, S30 in FIGS. 3, and S34 in FIG. 3, when the request packet is sent from the PC 20, the AP 4 (or the AP 8) sends the data representing the web page including all of the SSID, the authentication method, the encryption method, and the encryption key. However, the AP 4 (or AP 8) may send data representing a web page at least including the SSID and not including all of or a part of other information (the authentication method, the encryption method, and the encryption key). In other words, whether or not to send all of or a part of the authentication method, the encryption method, and the encryption key in addition to the SSID may be dependent on an AP type. In a configuration of the present modification, similarly, the PC 20 can acquire at least the SSID and cause the SSID to be displayed on the display unit 22. Generally speaking, "information including the identifier of the access point" includes at least the identifier of the access point and, may or may not include other information (an authentication method, an encryption method, and an encryption key).

(Tenth modification) In the above embodiment, in the case of NO in S28 in FIG. 3 (in other words, in the case of a value of the number of hops being greater than 1), the display controlling unit 70 activates the web browser by utilizing the IP address of the AP 8. Alternatively, in the case of NO in S28 in FIG. 3, the display controlling unit 70 may end the second assistance process without activating the web browser. In both the above embodiment and the present modification, in the case of NO in S28 in FIG. 3, the display controlling unit 70 does not send the request packet with the "IP address of the DHCP server" included in the network information 50 as the destination. In other words, generally speaking, in a second case where a determination is made that the access point having the router function may exist on the communication path, the display controlling unit need not send a signal with the extracted IP address of the assignment server as destination. According to this configuration, in the case of not being able to acquire the identifier of the access point, transmission of the signal with the extracted IP address of the assignment server as destination can be inhibited. In other words, wasteful transmission of signals can be reduced and an increase in communication load of the network can be suppressed.

(Eleventh modification) Moreover, the functions of the respective units 60, 62, 70, and 72 in the above embodiment may be realized by software as in the above embodiment. However, at least a part of units 60, 62, 70, and 72 may be realized by hardware such as a logic circuit.

What is claimed is:

1. An assistance device comprising:
   an interface configured to communicate with a network;

a memory storing network information related to the network, the network information comprising a first IP address assigned to the assistance device by a Dynamic Host Configuration Protocol ("DHCP") server, DHCP information, and a second IP address assigned to the DHCP server; and a controller configured to execute:
acquiring the network information from the memory;
determining whether the DHCP information indicates that the DHCP server is enabled;
when the controller determines that the DHCP information indicates that the DHCP server is enabled, extracting the second IP address of the DHCP server from the network information stored in the memory;
sending a particular packet with a destination of the second IP address;
in response to the sending of the particular packet, receiving a response packet;
determining whether the response packet indicates that an access point exists between the assistance device and the DHCP server by analyzing the response packet;
when the controller determines that the response packet indicates that an access point having a router function exists between the assistance device and the DHCP server, extracting a third IP address assigned to the access point from the response packet;
sending a request to the access point at the third IP address for particular information of the access point;
receiving, from the access point, the particular information including an identifier of the access point; and
displaying the particular information including the identifier of the access point on a display.

2. The assistance device as in claim 1,
wherein the particular packet includes an IP header,
wherein a particular value of Time to Live ("TTL") is set in the IP header, and
wherein the particular value is decremented when the particular packet is received by a router.

3. An assistance device for providing a user with an identifier of an access point which is to be set in a wireless device, the assistance device comprising:
a controller configured to execute:
determining, by utilizing specific information included in network information related to a network and stored in the assistance device, whether an IP address of the assistance device is an IP address that was assigned by an IP address assignment server;
extracting, from the network information stored in the assistance device, an IP address of the IP address assignment server that assigned the IP address of the assistance device to the assistance device when it is determined that the IP address of the assistance device is the IP address that was assigned by the IP address assignment server; and
obtaining from the access point, by utilizing the extracted IP address of the IP address assignment server, information including the identifier of the access point, so as to display the information including the identifier of the access point on a display unit,
wherein the determining includes determining, under a situation where the assistance device is being connected to a network including the access point, by utilizing the specific information included in the network information related to the network and stored in the assistance device, whether the IP address of the assistance device is the IP address that was assigned by the IP address assignment server,
wherein the extracting includes extracting, under the situation where the assistance device is being connected to the network including the access point, from the network information stored in the assistance device, the IP address of the IP address assignment server that assigned the IP address of the assistance device to the assistance device when the controller determines that the IP address of the assistance device is the IP address that was assigned by the IP address assignment server, and
wherein the obtaining includes obtaining from the access point, by utilizing the extracted IP address of the IP address assignment server, the information including the identifier of the access point, so as to display, under the situation where the assistance device is being connected to the network including the access point, the information including the identifier of the access point on the display unit.

4. The assistance device as in claim 3, wherein obtaining information from the access point includes sending a first signal, with the extracted IP address of the IP address assignment server as destination, to the access point that is configured integrally with the IP address assignment server, so as to obtain the information including the identifier of the access point from the access point.

5. A method executed in an assistance device for providing a user with an identifier of an access point that is to be set in a wireless device, the method comprising:
determining, by utilizing specific information included in network information related to a network and stored in the assistance device, whether an IP address of the assistance device is an IP address that was assigned by an IP address assignment server;
extracting, from the network information stored in the assistance device, an IP address of the IP address assignment server that assigned the IP address of the assistance device to the assistance device when it is determined that the IP address of the assistance device is the IP address that was assigned by the IP address assignment server; and
obtaining from the access point, by utilizing the extracted IP address of the IP address assignment server, information including the identifier of the access point, so as to display the information including the identifier of the access point on a display unit,
wherein the determining includes determining, under a situation where the assistance device is being connected to a network including the access point, by utilizing the specific information included in the network information related to the network and stored in the assistance device, whether the IP address of the assistance device is the IP address that was assigned by the IP address assignment server,
wherein the extracting includes extracting, under the situation where the assistance device is being connected to the network including the access point, from the network information stored in the assistance device, the IP address of the IP address assignment server that assigned the IP address of the assistance device to the assistance device when the controller determines that the IP address of the assistance device is the IP address that was assigned by the IP address assignment server, and wherein the obtaining includes obtaining from the access point, by utilizing the extracted IP address of the IP address assignment server, the information including the identifier of the access point, so as to display, under the situation where the assistance device is being connected to the network including the access point, the information including the identifier of the access point on the display unit.

* * * * *